March 11, 1952    I. W. ARCHIBALD    2,588,690
APPARATUS FOR THE MANUFACTURE OF GLASS WOOL AND
OTHER FILAMENTOUS LIQUEFIABLE SOLID MATERIALS
Filed Feb. 9, 1949            3 Sheets-Sheet 1

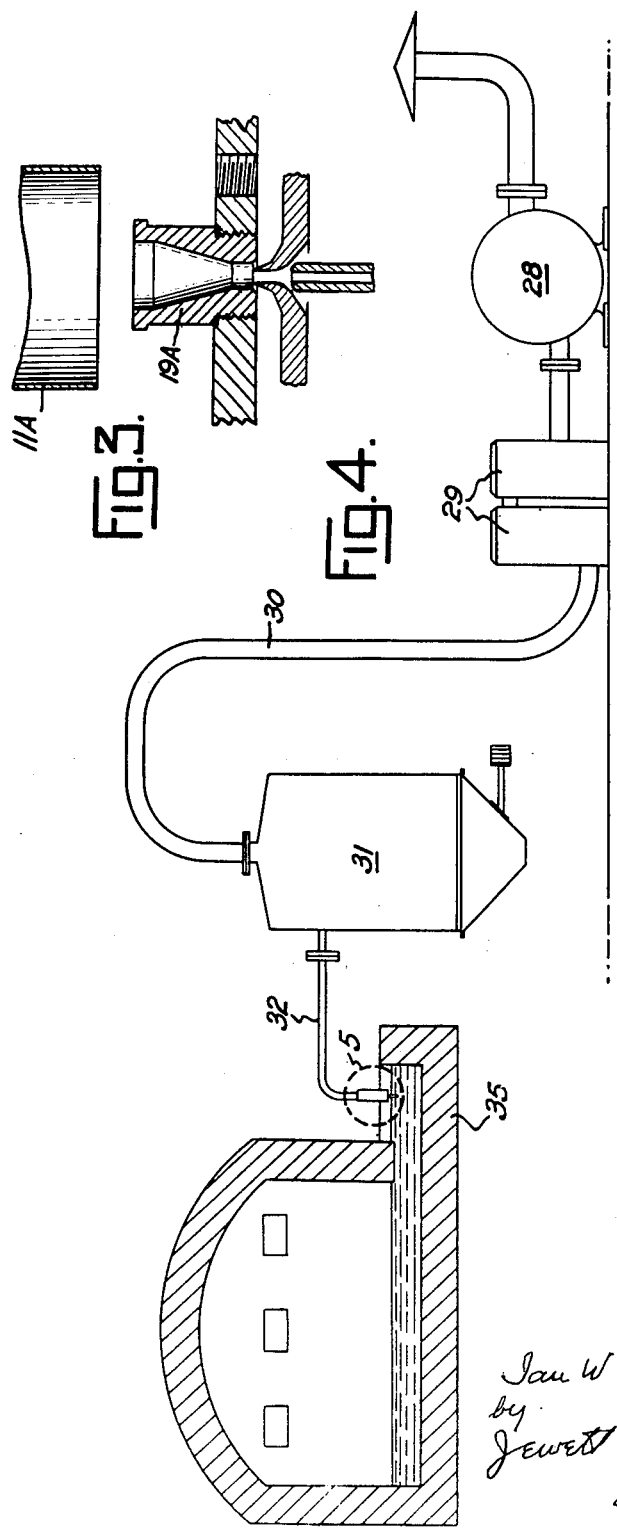

March 11, 1952 — I. W. ARCHIBALD — 2,588,690
APPARATUS FOR THE MANUFACTURE OF GLASS WOOL AND
OTHER FILAMENTOUS LIQUEFIABLE SOLID MATERIALS
Filed Feb. 9, 1949 — 3 Sheets-Sheet 3

Patented Mar. 11, 1952

2,588,690

UNITED STATES PATENT OFFICE 2,588,690

APPARATUS FOR THE MANUFACTURE OF GLASS WOOL AND OTHER FILAMENTOUS LIQUEFIABLE SOLID MATERIALS

Ian Wilson Archibald, Sydney, New South Wales, Australia, assignor to James Hardie & Coy. Pty. Limited, Sydney, New South Wales, Australia, a company of New South Wales Application February 9, 1949, Serial No. 75,428
In Australia February 20, 1948

10 Claims. (Cl. 18—2.5)

Hitherto in the manufacture of filamentous masses of glass or other liquefiable solid material (herein collectively referred to as "glass wool") it has been usual to create very fine gravitationally falling continuously running streams of molten "glass," and subsequently subject such streams to the action of air or other gaseous blasts whereby the stream or streams are attenuated still further to bring them to the required filament fineness. The prior practice of the attenuating very fine continuous descending single streams of molten material is efficient up to a point, but is defective inasmuch as attenuation of individual streams gives a relatively slow production rate because each such stream is formed into only a single filament, and when (in an attempt to speed up production) many such streams are dealt with concurrently, multiplicities of nozzles and other apparatus items are required, thus increasing the cost of equipment and providing for many molten glass issue points within which objectionable glass freezing may occur.

The main object of the present invention is to overcome the defects referred to above by the provision of a very simple and efficient means for the manufacture of glass wool.

A further object is the production of glass wool which is superior to existing wools by reason of the greater, or more readily controlled, degrees of filament fineness which may be readily obtained, and, the production of filaments which "curl" or have intertwining properties whereby the felting or self-binding qualities are improved, as is desirable for effective use of the wool as a non-crumbling heat insulatory mass, or as an ingredient in asbestos cement mixes or the like.

A further object is the provision of cheap and simple apparatus for producing glass wool in rope-like masses of filaments readily adapted for massing into relatively uniformly dense bats; such cheapness and simplicity of apparatus being largely due to the mass or "bunch" attenuation and production of filaments; the reduction of platinum or other expensive portions of apparatus to a minimum; and the avoidance of glass freezing of the kind which in prior nozzle and like arrangements may necessitate frequent dismantlings and operational haltings for replacement purposes.

According to this invention a method of producing filamentous masses of liquefiable solid material mainly comprises the steps of inducing the material, while in molten condition, to rise within an upright open-ended feedpipe, and applying a gaseous updraft circumferentially about the top of the feedpipe whereby spillage of molten material from the top of the feedpipe is swept upwardly to cause bunch attenuation and subsequent solidification of the particles constituting said spillage.

The upward induction of the molten material is preferably effected by applying sub-atmospheric pressure to the upper end of the upright feedpipe. This feedpipe has its lower end in communication with a source of molten glass, so that a column of that liquid is caused to well up in said feedpipe and overflow from the top thereof. The gaseous updraft about the feedpipe strips fragments or particles from the molten glass overflow and these particles are carried upwardly preferably into a stricture tube such as the throat of a Venturi tube wherein the molten fragments are bunch attenuated and rapidly frozen, and then fed into a collector hopper or receiver into which the upper end of the stricture tube is open. The use of a Venturi tube or like constriction gives the advantage that the gaseous updraft thereinto serves the dual purpose of constituting the particle stripping agency, and also serving as an induction draft to cause the molten glass to rise within the feedpipe.

The preferred means whereby the invention may be carried into practical effect may be summarised as consisting in an upright feedpipe, means for placing the lower end of the feedpipe in communication with a source of molten glass, an upright Venturi tube into the lower and throat end of which the feedpipe is directed, and means for creating a gaseous suctional updraft through the Venturi tube whereby a column of molten glass may well up within the feedpipe and overflow from the upper end thereof, and whereby molten fragments may be circumferentially stripped from the molten column overflow for bunch or mass attenuation within, and upward transit through, the Venturi tube towards a collector device.

Examples of apparatus according to the invention are illustrated in the drawings herewith.

Figure 2:
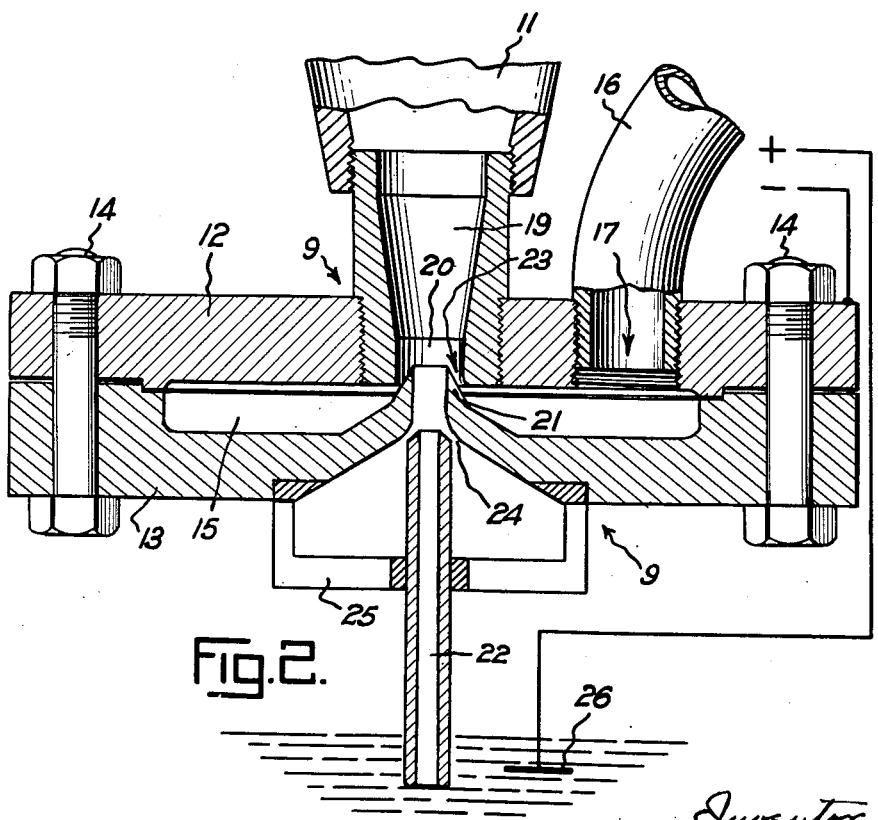
Figure 2 is a sectional side elevation, on an enlarged scale, of an attenuator unit which appears in Figure 1 within the circle marked 2.

Figure 3 repeats a portion of Figure 2 (on a smaller scale) to illustrate a minor modification.

Figure 1:
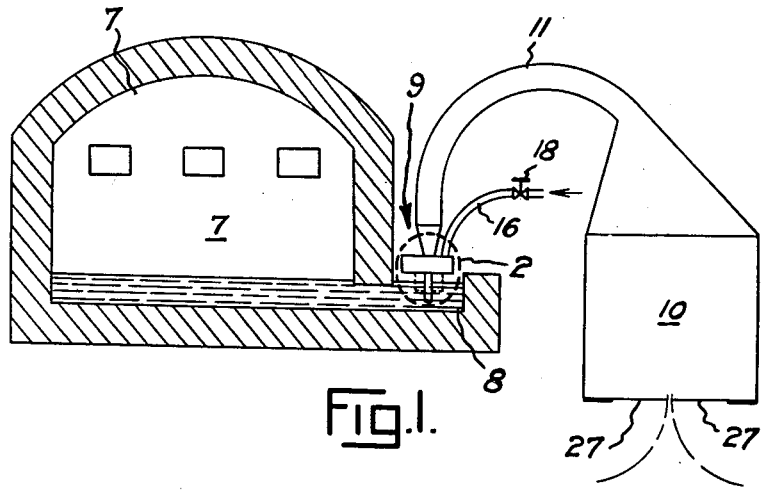
Figure 1 is a partly sectioned side elevation showing a schematic lay-out of a preferred apparatus.

Figure 4 is a similar view to Figure 1 showing an alternative embodiment of the invention.

Figure 5:
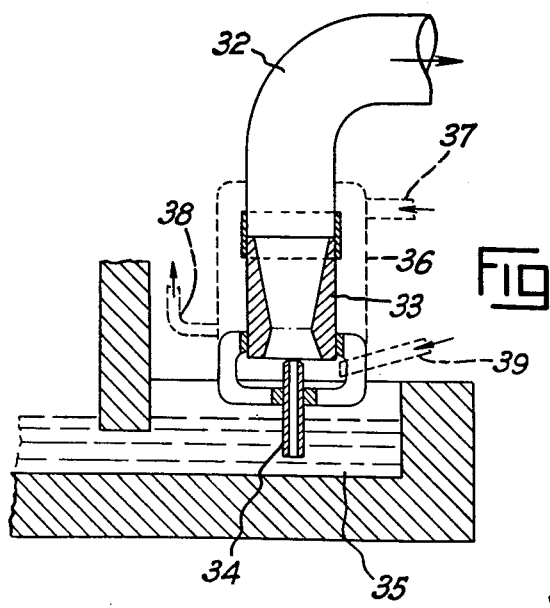

Figure 5 is a sectional side elevation, on an enlarged scale, of an attenuator unit which appears in Figure 4 within the circle marked 5.

Figure 6:
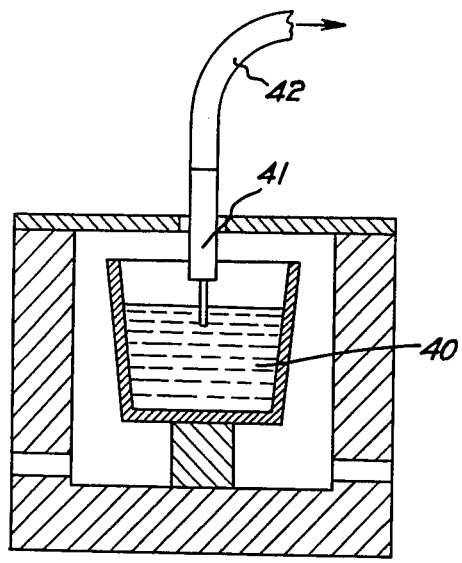

Figure 6 is a similar view to Figure 1 showing an application of the apparatus to a small batch type furnace.

The apparatus illustrated in Figure 1 comprises a conventionally designed glass furnace 7 having a take-off 8, an attenuation unit, designated generally by 9 (see also Figure 2) and a glass wool receiver 10 joined to the attenuator 9 by a delivery trunk 11.

The attenuator and the manner in which molten glass is treated therein may be regarded as the crux of this invention. The remainder of the apparatus and its manner of handling glass, either as a liquid or as a filamentous wool, are substantially in accordance with conventional practice.

Referring mainly to Figure 2, the attenuator comprises top and bottom plates 12 and 13 respectively. These plates are clamped together (for example, by bolts 14) and they (or one of them) are (or is) hollowed to form a blast distributor chamber 15. A blast pipe 16 opens into chamber 15 at 17. The blast may consist of steam (saturated or superheated) air, or other non-combustive gaseous fluid. The blast pipe extends to a conventional source of such fluid under pressure, and includes a regulator valve indicated at 18 (Figure 1). An upright Venturi nozzle 19 has its stricture or throat 20 open to chamber 15. The top of nozzle 19 opens to the inlet end of trunk 11.

The molten glass feedpipe (in the form of attenuator shown by Figure 2) is in two parts; namely, top nozzle 21 and tube 22. The top of the feedpipe is directed into the Venturi throat 20 thus to define (with the throat) an annular blast inlet port 23. The bottom of the feedpipe dips into molten glass in the take-off 8.

The feedpipe may be in one piece (as described later herein with reference to Figure 5) but for preference it is in two parts, as shown in Figure 2, so that an annular port 24 is defined by the mutually adjacent ends of the parts 21 and 22.

Experiment has shown that the provision of a port such as 24 allows a circumferential indraft of air which causes a preliminary break-up of the molten glass column into relatively small particles. This preliminary break-up facilitates the particle stripping action, which takes place at the top of the feedpipe, due to the major updraft through port 23. The feedpipe portion 22 may be endwisely adjusted (in its support bracket 25) to vary the effective area of port 24, and in this manner the fineness of the stripped particles and hence the fineness or length of the attenuated filaments may be varied. It will be clear that any longitudinal adjustment of the feedpipe portion 22 must not be such as will make the port 24 large enough to render the low pressure obtaining in the Venturi throat insufficient to induce molten glass into the Venturi tube.

Additional control for filament fineness may be exercised by varying the temperature at which the molten glass arrives at the top of the feedpipe. The glass temperature may be varied simply by varying the operating temperature of the furnace, or by heating the molten glass locally in the vicinity of the feedpipe. Local heating may be effected by dipping two electrodes in the glass adjacent the feedpipe and connecting the electrodes in circuit so that the glass functions as a resistance heating element, it being suitably conductive when molten. As a further alternative, local heating may be effected by use of an electrode 26 (see Figure 2) and by using the feedpipe portion 22 as a second electrode, circuit connections being made as indicated diagrammatically in Figure 2. Additional or alternative control for filament fineness may be effected by heating the blast delivered into chamber 15, thus delaying filament solidification and thereby enabling increased attenuation.

In operation (the bottom of the feedpipe dipping into the molten glass) the blast is turned on, and flows into the Venturi throat. The pressure drop, due to the throat constriction, causes molten glass to well up the feedpipe and tend to overflow circumferentially from the top of nozzle 21. The overflow is circumferentially stripped from the nozzle by the blast, attenuated in the Venturi nozzle and frozen solid on its way to the receiver 10. The receiver is of the known type having bottom doors 27 for removal of accumulated wool.

The blast may be delivered to the distributor chamber at any pressure sufficient to lift the molten glass to the top of the feedpipe. Experiment has been made with blast pressures of from 30 to 150 lbs. per square inch. The pressure employed is preferably one which will give supersonic upward velocity of blast in the Venturi throat. The induced sub-atmospheric pressure (in the Venturi throat) may be as low (theoretically) as absolute vacuum (or a minimum of say 14 inches of mercury) or as great as 2 inches of mercury. The sub-atmospheric pressure and or temperature of the blast, and or the dimensions of the inway ports may be varied (as previously indicated herein) to enable controlled expansion of the blast in the Venturi throat. This enables close control of the filament fineness, as may be required, according to the viscosity of the glass in use or the temperatures of operation.

It will be appreciated that more than one feedpipe may be directed into a single Venturi throat, and that more than one attenuator may be associated with a single furnace or a single wool receiver.

If desired, the feedpipe (or pipes) while still disposed substantially upright, may be helically or obliquely directed into the Venturi throat in order to create a whirling effect therein, and thus curl the attenuating filaments.

Although the invention is, at present, primarily directed to the manufacture of glass filaments (now using the term "glass" in accordance with its ordinary signification) the invention is equally applicable to the bunch filamentation of other liquefiable normally solid materials, such as ethyl cellulose or the like and possibly metals.

The attenuator shown (incompetely) in Figure 3 is substantially the same as that of Figure 2, with the difference that instead of being directly joined to a trunk such as 11 (Figures 1 and 2) the trunk 11A has an open end considerably wider than, and spaced from, the upper end of the Venturi nozzle 19A. This construction enables a rod to be passed laterally between the trunk and the Venturi nozzle so that a wool sample may be collected for inspection without halting operation.

The arrangement shown in Figures 4 and 5 differs from these described above mainly in its provision for an attenuating blast being by way of suction through its Venturi nozzle instead of by forced injection thereinto. Suction blast is provided for by a vacuum pump 28 pulling through air filters 29 (to arrest any filament fragments coming over from the attenuator), duct 30, wool receiver 31 (which may be an ordinary "cyclone" type separator), and a delivery trunk 32 connected directly to the top of the Venturi nozzle 33. A feedpipe 34 (a one-piece feedpipe, by the way) has its lower end dipping into a furnace take-off 35 and its top end directed into the throat of nozzle 33.

The modification of Figures 4 and 5 operates in similar fashion to that previously described herein. The Venturi nozzle 33 may be surrounded by a jacket 36 having inlet and outlet pipes 37 and 38 for a cooling fluid, if early filament solidification is required. Alternatively, pipes 37 and 38 may be used (reversely) for a heating fluid if retarded solidification (and hence greater attenuation) is required. Further control is available by longitudinal adjustment of feedpipe 34 and or by provision of a jet pipe 39 whereby hot gas may be delivered to the bottom of the Venturi nozzle for suctional induction thereinto.

Figure 6 shows a furnace 40 for melting a relatively small quantity of glass, as a batch. The attenuator 41 and its delivery trunk 42 may be of the kind shown in Figures 2, 3 or 5.

I claim:

1. Apparatus for producing a filamentous mass of liquefiable solid material comprising, an upright feedpipe, means for holding the bottom end of said feedpipe submerged in a body of said material in molten condition, a Venturi nozzle into the throat end of which the upper end of said feedpipe is directed, and means for passing a gaseous updraft through said nozzle and about the upper end of said feedpipe.

2. Apparatus for producing a filamentous mass of liquefiable solid material comprising a distributor chamber, a Venturi nozzle whereof the throat opens into said chamber, an upright feedpipe whereof the upper end opens into said throat, means for holding the bottom end of said feedpipe submerged in a body of said material in molten condition, and means for delivering gas under pressure into said chamber.

3. Apparatus for producing a filamentous mass of liquefiable solid material comprising a Venturi nozzle whereof the throat is open to atmosphere, an upright feedpipe whereof the upper ends into said throat; means for holding the lower end of said feed pipe submerged in a body of said material in molten condition, and means for suctionally drawing atmosphere through said throat.

4. Apparatus according to claim 2 wherein said feedpipe consists of a nozzle top part and a tube bottom part thereby to form an annular air inlet port between the mutually adjacent ends of said parts.

5. Apparatus according to claim 2 wherein said feed pipe consists of a nozzle top part and a tube bottom part thereby to form an annular air inlet port between the mutually adjacent ends of said parts and said tube bottom part is longitudinally adjustable relative to said Venturi throat.

6. Apparatus according to claim 3 wherein said feedpipe is longitudinally adjustable relative to said Venturi throat.

7. The combination with apparatus according to claim 1 of a filamentous wool receiver and a delivery trunk connected to said receiver and to the outlet end of said Venturi nozzle.

8. The combination with apparatus according to claim 1 of a filamentous wool receiver and a delivery trunk having one end connected to said receiver and its other end opening to atmosphere adjacent to the outlet end of said Venturi nozzle.

9. Apparatus according to claim 1 which includes electrical means for heating a body of the said material in the vicinity of the bottom of said feedpipe.

10. Apparatus according to claim 1 which includes means for heating gas about to enter said Venturi throat.

IAN WILSON ARCHIBALD.

REFERENCES CITED

The following references are of record in the file of this patent:

UNITED STATES PATENTS

| Number | Name | Date |
| --- | --- | --- |
| 1,501,449 | Hall | July 15, 1924 |
| 2,235,352 | Bates | Mar. 18, 1941 |